Jan. 2, 1940.   P. H. ARMSTRONG   2,185,170
ATTACHMENT FOR HAND OPERATION OF FOOT BRAKES AND THE LIKE

Filed Nov. 19, 1938

INVENTOR:
PAUL H. ARMSTRONG,
BY  *Harry B. Rook,*
ATTORNEY.

UNITED STATES PATENT OFFICE 2,185,170

ATTACHMENT FOR HAND OPERATION OF FOOT BRAKES AND THE LIKE

Paul H. Armstrong, Orange, N. J.

Application November 19, 1938, Serial No. 241,352

4 Claims. (Cl. 74—481)

This invention relates particularly to an attachment for pedal operated brake mechanisms, pedal operated clutch mechanisms and the like to permit operation by hand of brakes, clutches and other normally foot-operated mechanisms.

Under normal driving conditions with the usual motor vehicle on long trips or in congested traffic, it is necessary for the operator to shift his foot from the accelerator pedal to the bake pedal and vice versa many times, which is tiresome, both physically and mentally. When it is necessary to stop and start the vehicle on a hill, the sequential operation of the brake pedal and accelerator pedal is especially troublesome with great danger of accident, and the use of the emergency brake instead of the foot brake does not materially reduce the trouble. Furthermore, with the usual foot-operated brake pedals and clutch pedals, it is difficult, if not impossible, for a person with an injured or crippled foot or leg to operate an automobile.

Hand operated attachments for actuating foot-operated brake mechanisms and clutch mechanisms have been proposed, for example, as shown in United States patents, No. 1,353,379 dated September 21, 1920 and No. 1,906,366 dated May 2, 1933, but these devices are either too complicated and expensive, or too difficult or inconvenient to operate, or so located and occupy so much space adjacent the driver's seat as to become hindrances.

Therefore, a prime object of my invention is to provide a novel and improved device to permit hand operation of normally pedal-operated brake mechanisms, clutch mechanisms and the like, which shall be simple and inexpensive in construction and easy and convenient to operate, and all parts of which may be located in an out-of-the-way position with respect to the driver's seat of an automobile, whereby to enhance safety and comfort in driving an automobile.

Another object is to provide such a device that shall embody novel and improved features of construction whereby a normally foot-operated brake or clutch mechanism can be operated by hand with the exertion of a small fraction of the amount of energy required to operate such brake or clutch mechanisms by the foot so as to reduce to the minimum the fatigue and strain incident to driving motor vehicles.

A further object is to provide a device of this character wherein the handle or portion of the device to be gripped for operation shall be conveniently located to permit operation of the brake and the modern remote gear shift control simultaneously and with the same hand, whereby to facilitate the operation of a motor vehicle.

Figure 1:

Other objects are to provide an attachment of the character described which can be applied without difficulty to motor vehicles of different types or made by different manufacturers; and to provide other advantages and results as will be brought out by the following description when read in conjunction with the accompanying drawing in which Figure 1 is a fragmentary perspective view of the interior of an automobile body showing the manner of operating my attachment for hand operation of foot brakes and the like.

Figure 2:
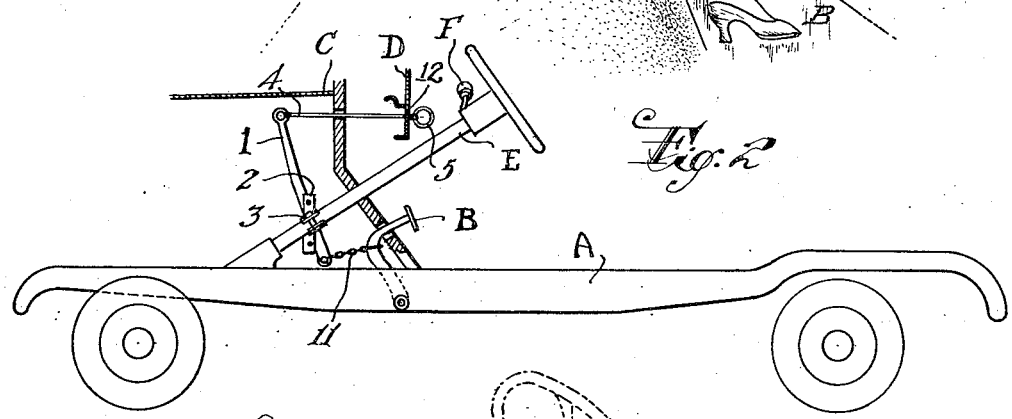
Figure 3:
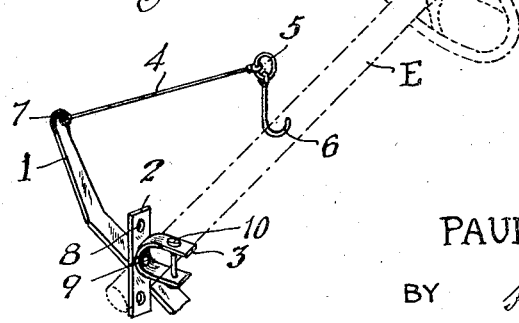

Figure 2 is a schematic sectional side elevational view of my attachment applied to an automobile, and Figure 3 is a fragmentary detached perspective view of the attachment.

Specifically describing the invention, I have shown it as applied to a known type of automobile including a chassis or frame A having mounted thereon in the usual manner a foot pedal B for operating the brake mechanism or the clutch mechanism. The other parts of the brake and clutch mechanism are omitted from the drawing but may be of any known type. Mounted on the chassis A in known manner is the usual engine hood C and dash board or instrument board D, and the usual steering post E is shown as mounted on the chassis in the usual manner with a portion thereof disposed beneath the engine hood C. The steering post has mounted thereon the known modern type of remote control shift lever F for the gear shift mechanism.

My invention comprises an attachment for the hand operation of the foot operated brake mechanism or the foot operated clutch mechanism, the attachment including a part such as a lever 1 movably mounted beneath the engine hood, for example on the steering post E, and being operatively connected to the brake mechanism or clutch mechanism, for example, the pedal B, and having a hand grip 5 accessible at the front of the dash board D.

More specifically the lever 1 is pivotally mounted intermediate its ends as at 9 on a bracket which includes a U-shaped split clamp 3 embracing the steering post E and secured thereon by a bolt 10. The clamp 3 has rigidly secured to the base portion thereof, as by welding, a lever supporting arm 2 which is disposed transversely of the steering post at one side thereof, and has a plurality of openings 8 to selectively receive the pivot bolt 9 for mounting the lever at different positions with respect to the steering post to accommodate variations in the construction of automobiles and the relation of the steering post E to the pedal B and engine hood. The lever preferably is pivoted on a horizontal axis and has its lower end connected with a lost motion connection, such as a flexible connector 11, to the pedal B. To the other end of the lever is pivotally connected at 7, a flexible pull member 4, such as a wire cable, to the end of which is attached the hand grip 5. This hand grip may be of any suitable form but conveniently comprises a ring which easily may be gripped by the index finger and thumb of the operator. As shown, the flexible pull member 4 slidably passes through an opening 12 in the dash board D and one end of the pull member is directly connected to the hand grip 5 so that the latter can be moved freely in all directions in front of the dash board and thereby enable the hand grip to be located and operated in a position convenient to the driver of the automobile.

In operation of the automobile embodying my attachment, the driver may hold his foot in position constantly on the accelerator pedal G and apply the brakes simply by grasping the hand grip 5 and pulling outwardly from the dash board as shown in Figure 1. This operation swings the lever 1 so as to exert, through the flexible connector 11, a pull on the pedal B in the direction necessary to apply the brakes. However, if desired, the operator may operate the brakes through the foot pedal in the usual way, the lost motion connection 11 permitting this operation independently of the lever 1 and hand grip 5. Due to the mechanical advantage afforded by the lever 1, only a small amount of energy need be applied to the hand grip 5 so that hand operation of the brakes requires a small fraction of the amount of energy required to operate the brakes with the foot.

Preferably the hand grip 5 will be so located that when it is pulled outwardly as shown in Figure 1 to apply the brakes, the remote control shift lever F of the gear shift mechanism may be operated while the brakes are held applied, and with the same hand. If desired, the hand grip 5 may have an auxiliary or extension grip 6 to facilitate this operation and also to permit operation of the better known type of gear shift lever which projects upwardly from the floor of the automobile body.

It will be observed that my attachment is wholly concealed beneath the engine hood of the automobile, the hand grip 5 being the only part normally exposed, so that the attachment does not detract from the driver's space in the automobile and in no way hinders free movements of the driver. Due to the convenience and ease in operation thereof, my attachment enhances the safety and comfort and at the same time reduces the fatigue and strain incident to driving motor vehicles.

Many modifications and changes in the details of structure of the attachment, especially to adapt it to different types of automobiles, will occur to those skilled in the art as being within the scope and spirit of the invention.

Having thus described my invention, what I claim is:

1. In combination with parts of an automobile including the foot pedal of a foot pedal operated mechanism, the engine hood and the dash board, of a lever pivotally mounted on a horizontal axis intermediate its ends beneath said hood, a hand grip accessible in front of said dash board, a flexible connector between one end of said lever and said hand grip, and a lost-motion connection between the other end of said lever and said foot pedal to actuate said foot pedal in one direction by a pull on said hand grip and permit said foot pedal to be operated in said direction by the foot independently of said lever and said hand grip.

2. The combination set forth in claim 1 wherein said dash board has an opening and said flexible connector is slidable through said opening, whereby the hand grip is freely movable in all directions in front of said dash board.

3. An operating element for a foot pedal operated mechanism of an automobile, including a lever, means for pivotally mounting said lever intermediate its ends on a fixed support, a hand grip, an operative connection between said hand grip and one end of said lever including a flexible connector directly connected to said hand grip, and a second flexible connector one end of which is connected to the other end of said lever, the other end of said second flexible connector being constructed for attachment to the foot pedal of said mechanism.

4. In combination with the parts of an automobile including the foot pedal of a foot pedal operated mechanism, the engine hood, dash board and the steering post having a portion disposed beneath said engine hood, of an actuating mechanism comprising a lever, a U-shaped split clamp embracing a portion of said steering post beneath said engine hood, an arm secured to the base of said clamp and disposed transversely of said steering post at one side thereof, means pivotally connecting said lever on said arm, a hand grip operatively connected to said lever for actuating the latter and extending through and accessible at the front of said dash board, and an operative connection between said lever and said foot pedal for actuating the latter upon operation of said hand grip.

PAUL H. ARMSTRONG.